United States Patent
Wilkinson

(10) Patent No.: US 8,331,877 B1
(45) Date of Patent: Dec. 11, 2012

(54) WIRELESS DRINK ORDER TRAY

(76) Inventor: Christopher P. Wilkinson, Sneads Ferry, NC (US)

( * ) Notice: Subject to any disclaimer, the term of this patent is extended or adjusted under 35 U.S.C. 154(b) by 507 days.

(21) Appl. No.: 12/751,225

(22) Filed: Mar. 31, 2010

(51) Int. Cl.
*H04B 1/38* (2006.01)
(52) U.S. Cl. .................. 455/90.3; 206/557; 220/556
(58) Field of Classification Search .......... 455/90.3, 455/575.1; 16/425, 430; 264/273; 294/3.5, 294/172, 167, 144, 137; 206/201, 217, 557, 206/561–565, 524.3, 524.6; 220/23.86, 556, 220/571, 762, 757, 574; 224/222, 218, 219, 224/220

See application file for complete search history.

(56) References Cited

U.S. PATENT DOCUMENTS

| 2,679,736 | A | 6/1954 | Duchin | |
|---|---|---|---|---|
| 6,622,885 | B1 * | 9/2003 | Erman | 220/571 |
| 6,814,235 | B2 | 11/2004 | Wang | |
| 6,923,485 | B1 * | 8/2005 | Bauswell | 294/3.5 |
| 7,243,786 | B2 | 7/2007 | Sollazzo | |

* cited by examiner

*Primary Examiner* — Ping Hsieh

(57) ABSTRACT

A wireless serving tray including a support base having an ergonomic handle attached to the support base along a central longitudinal axis of the support base lower surface, a plurality of drink buttons disposed on the handle that wirelessly operationally engage a central processing unit which wirelessly communicate with a kitchen unit to order drinks, a trigger that selectively opens an aperture within the support base into which tip coins may be inserted and which pass into a reservoir beneath the support base, and a gap between the handle and lower surface of the support base through which a user passes his forearm to grasp the handle, thereby balancing the support base of the tray, as well as a U-shaped stabilizer member against which the user braces his inner elbow to further balance the tray.

5 Claims, 5 Drawing Sheets

WIRELESS DRINK ORDER TRAY

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Figure 1:
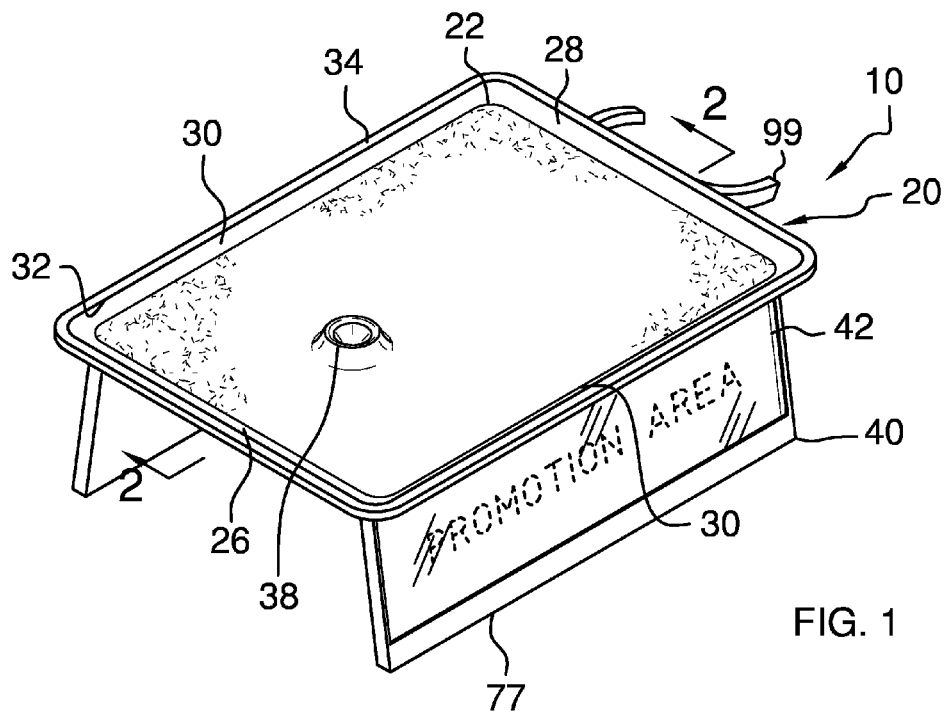

Various types of serving trays are known in the prior art. However, what is needed is a wireless serving tray including a support base having an ergonomic handle attached to the support base along a central longitudinal axis of the support base lower surface, a trigger that selectively opens a support base aperture into which tip coins may be inserted and also a plurality of drink buttons disposed on the handle that wirelessly operationally communicate with a central processing unit which, in turn, wirelessly communicates with a kitchen unit to order drinks, and a gap between the handle and lower surface of the support base through which a user passes his forearm to grasp the handle, thereby balancing the support base of the tray, as well as a U-shaped stabilizer member against which the user braces his inner elbow to further balance the tray.

FIELD OF THE INVENTION

The present invention relates to serving trays and, more particularly, to a wireless drink order tray.

SUMMARY OF THE INVENTION

The general purpose of the present wireless drink order tray, described subsequently in greater detail, is to provide a wireless drink order tray which has many novel features that result in a wireless drink order tray which is not anticipated, rendered obvious, suggested, or even implied by prior art, either alone or in combination thereof.

To accomplish this, the present wireless drink order tray a support base having an upper surface, a lower surface, a front wall attached to the upper surface, and an opposite rear wall attached to the upper surface as well as a pair of side walls attached to the upper surface at about a 45-degree angle to the upper surface. A tray lip is disposed along an entire upper edge of the front wall, the rear wall, and the side walls. An aperture is disposed through the support base upper and lower surfaces. A raised aperture lip surrounds the aperture. The present tray also includes a pair of parallelepiped legs hingedly attached to the support base lower surface along about the length of each of the side wall, each leg having a slot about the same length as the leg in which napkins may be stored. An ergonomic handle is attached to the support base along a central longitudinal axis of the support base lower surface. The handle includes a stalk having an internal cavity which passes tip coins therethrough which are placed into the aperture therein, the stalk being attached to the support base lower surface beneath the aperture and extending downwardly from the lower surface in a range of about 135 degrees to about 160 degrees from the lower surface. A trigger is attached to the stalk, the trigger selectively opening the aperture. A parallelepiped reservoir disposed parallel to the support base lower surface stores tip coins which have been inserted into the aperture and passed through the handle.

The present tray also includes a contoured arm rest member has an upper wall attached to the support base lower surface, a forward end attached to an upper inside edge of the handle and a rearward end attached to the support base lower surface near the rear wall of the support base. A gap is disposed between a lower wall of the arm rest member and the top wall of the reservoir and is sized to removably receive a human adult forearm therethrough. In addition, the present tray further includes a U-shaped stabilizer member having an apex attached parallel to the rear wall. The support base is placed in a balanced position upon the insertion of a human adult forearm through the gap and upon bracing an inner elbow thereof against the stabilizer member. A plurality of programmable drink buttons disposed on the handle near the trigger is in wireless operational communication with a CPU that has a transmitter. The transmitter is in wireless operational communication with a receiver of a kitchen unit which, in turn, fills drink containers with various drink types that have been ordered using the drink buttons. A plurality of drink containers may be carried on the support base upper surface.

To use the present wireless drink order tray, the user begins by pushing each leg outwardly from a folded position beneath the support base into a position perpendicular to the support base upper surface. The user then inserts a user's human adult forearm through the gap, grips the grip portion, and braces the user's inner elbow against the stabilizer member. The user selectively presses at least one of the drink buttons, each drink button corresponding to a drink type. By pressing a drink button, the user orders a corresponding drink type from the kitchen unit. The user may carry at least one drink container on the support base upper surface. Customers of the user may place tip coins into the aperture, wherein the tip coins slide into the reservoir interior cavity. The user may empty tip coins from the reservoir interior cavity.

The present tray is designed for sturdy balance through interworking of the ergonomic handle with its grip portion notches, the arm rest member, the gap, and the stabilizer member. The present tray is easily picked up by a user, carried, and set down. The present tray greatly reduces accidental spills and mishaps involved with serving food and beverages.

The present tray may also reduce the incidence of carpal tunnel syndrome by users who serve customers using conventional flat service trays because the present tray reduces pressure on the hands and wrist and provides evenly distributed pressure on the user's arm and offers a sturdier, ergonomic balance.

The present tray has a height in a range of about 6 inches to about 8 inches with the legs in an extended position, a length in a range of about 18 inches to about 24 inches, and a width in a range of about 12 inches to about 18 inches.

The present tray may be formed of durable, light weight materials, which may include composite materials, plastic, and neoprene. The present tray may also be formed utilizing an injection mould process. In addition, the tray may bear indicia for advertising, logos, and decals. The present tray is excellent for use in casinos, restaurants, airlines, cruise lines, and event centers as well as anyone in need of a tray for serving food and beverages.

Thus has been broadly outlined the more important features of the present wireless drink order tray so that the detailed description thereof that follows may be better understood and in order that the present contribution to the art may be better appreciated.

Numerous objects, features and advantages of the present wireless drink order tray will be readily apparent to those of ordinary skill in the art upon reading the following detailed description of presently preferred, but nonetheless illustrative, examples of the present wireless drink order tray when taken in conjunction with the accompanying drawings. In this respect, before explaining the current examples of the present wireless drink order tray in detail, it is to be understood that the invention is not limited in its application to the details of construction and arrangements of the components set forth in the following description or illustration. The invention is capable of other examples and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the wireless drink order tray. It is therefore important that the claims be regarded as including such equivalent constructions insofar as they do not depart from the spirit and scope of the present invention.

Objects of the present wireless drink order tray, along with various novel features that characterize the invention are particularly pointed out in the claims forming a part of this disclosure. For better understanding of the wireless drink order tray, its operating advantages and specific objects attained by its uses, refer to the accompanying drawings and description.

BRIEF DESCRIPTION OF THE DRAWINGS FIGURES

Figure 2:
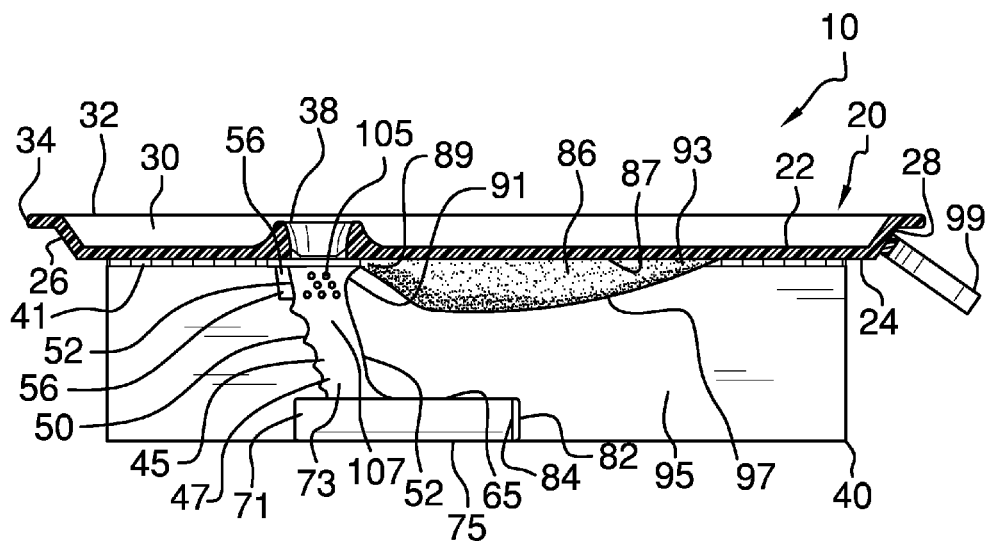
Figure 3:
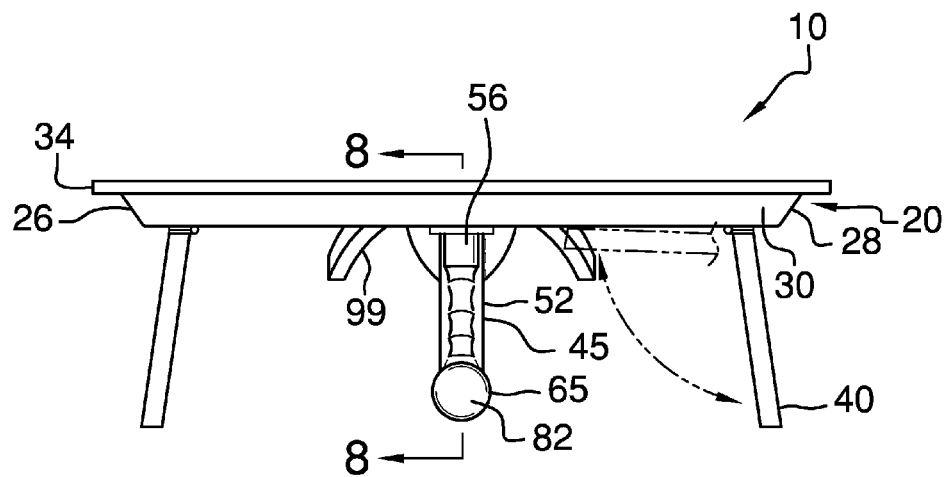
Figure 4:
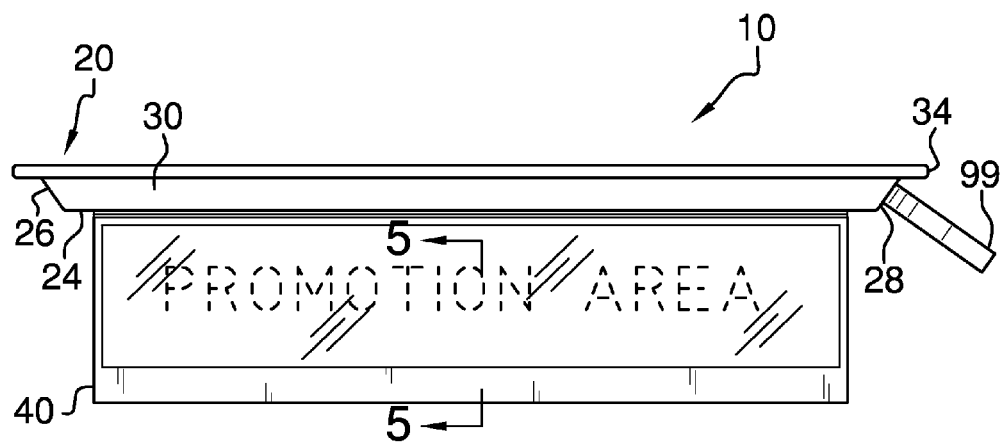
Figure 5:
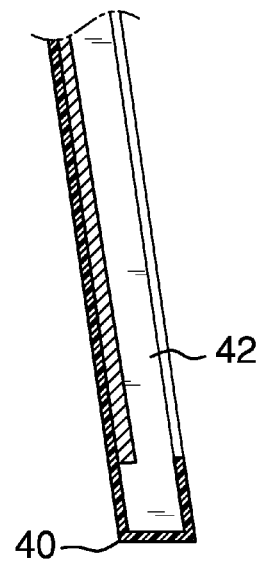
Figure 6:
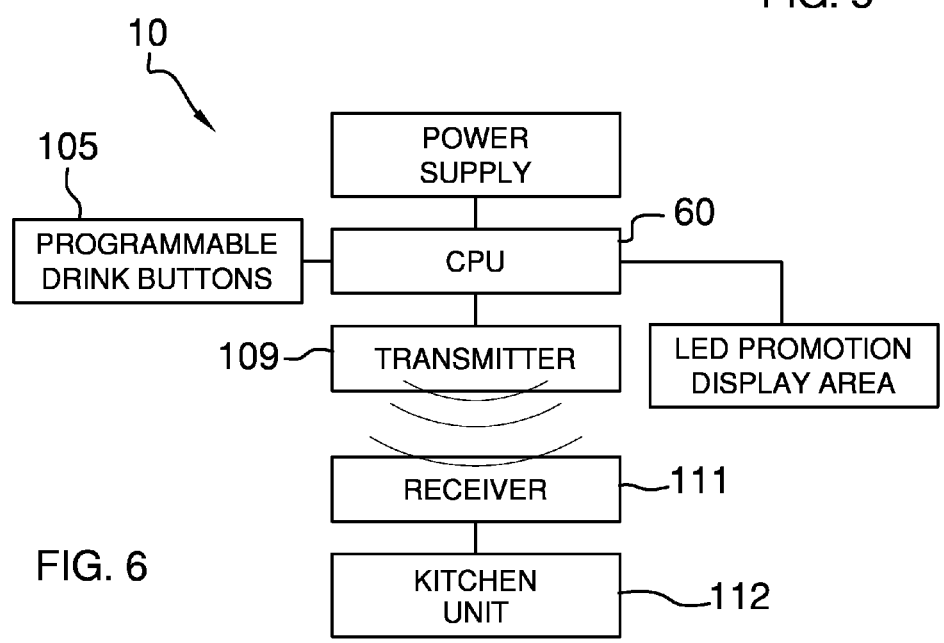
Figure 7:
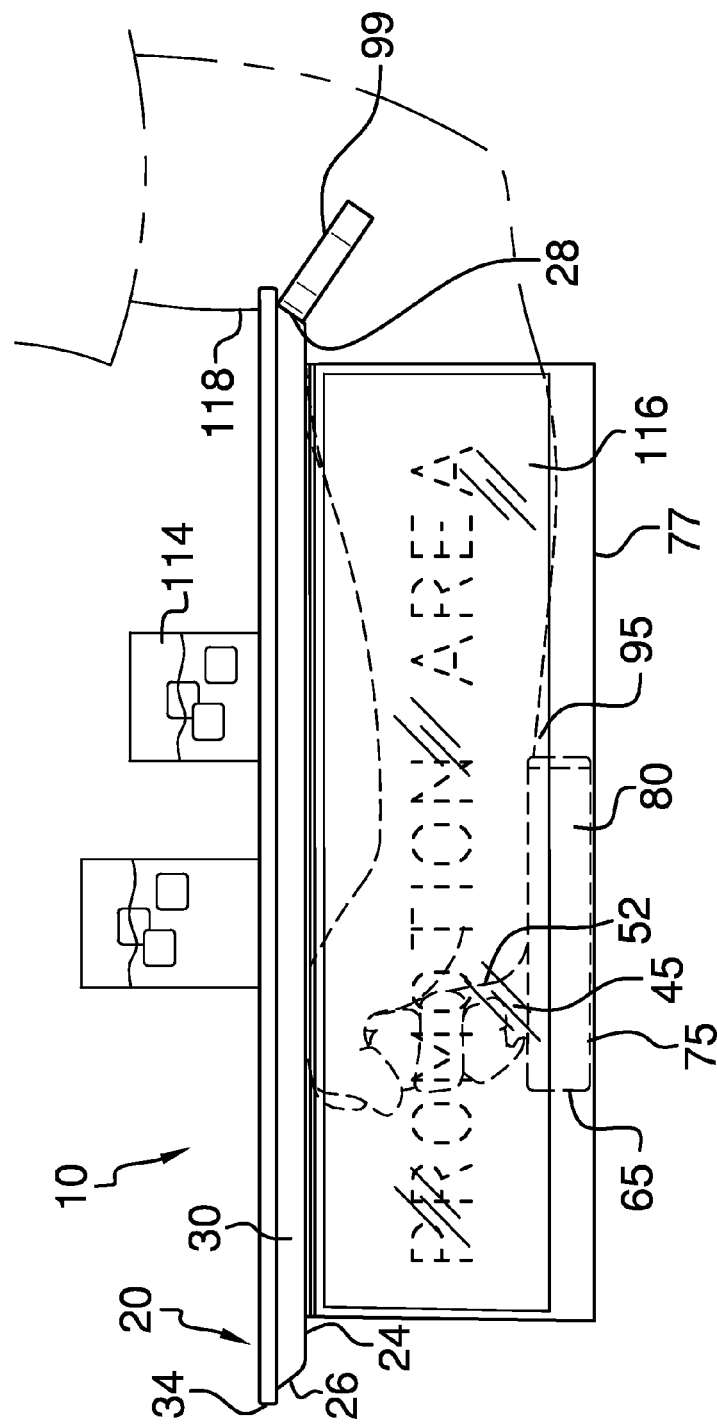
Figure 8:
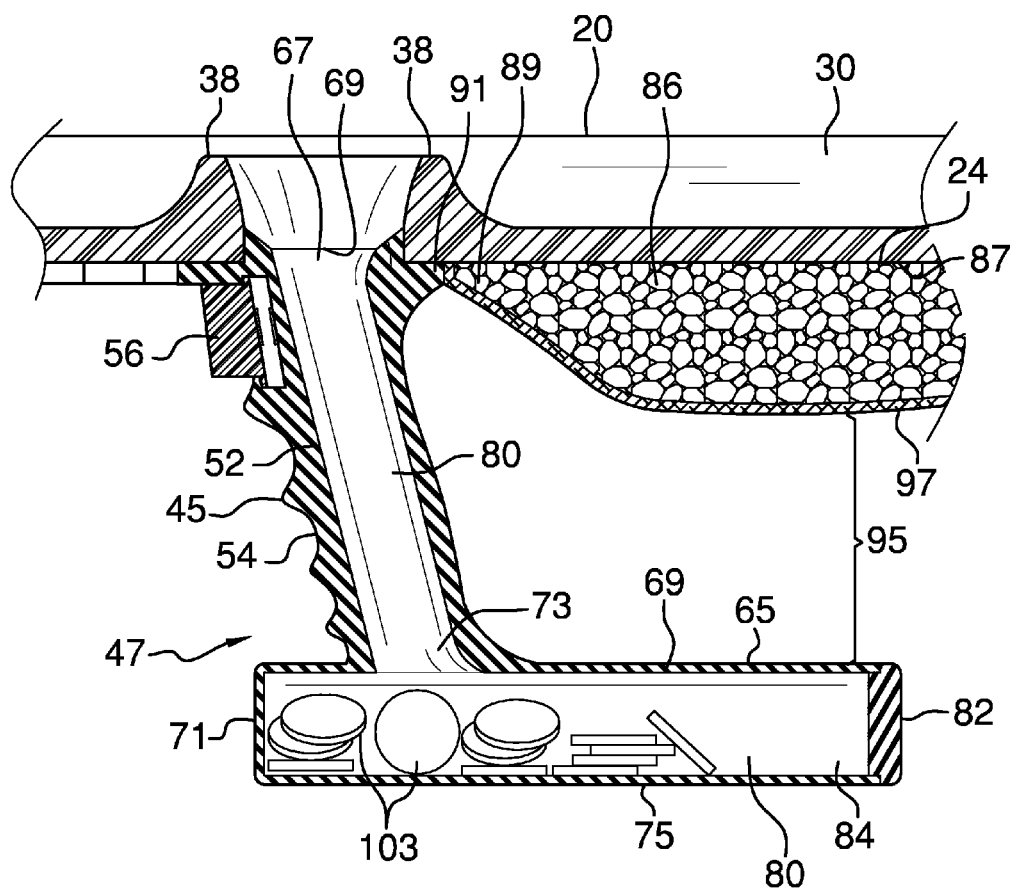

FIG. 1 is an isometric top view.
FIG. 2 is a right side view illustrated without a leg in place.
FIG. 3 is a front elevation view.
FIG. 4 is a right side view illustrated with a leg supporting the support base.
FIG. 5 is a cross section view of a leg taken along line 5-5 of FIG. 4.
FIG. 6 is block diagram of operation.
FIG. 7 is a side in-use view.
FIG. 8 is a cross section view of a handle taken along line 8-8 of FIG. 3.

DETAILED DESCRIPTION OF THE DRAWINGS

With reference now to the drawings, and in particular FIGS. 1 through 8 thereof, example of the instant wireless drink order tray employing the principles and concepts of the present wireless drink order tray and generally designated by the reference number 10 will be described.

Referring to FIGS. 1 through 8, the present wireless drink order tray 10 is illustrated. The wireless drink order tray includes a support base 20 having an upper surface 22, a lower surface 24, a front wall 26 attached to the upper surface 22, and an opposite rear wall 28 attached to the upper surface 22. The support base 20 also has a pair of side walls 30 attached to the upper surface 22. Each side wall 20 is disposed between an opposite one of the front wall 26 and the rear wall 28. Each of the front wall 26, the rear wall 28, and the side walls 30 are attached at about a 45-degree angle to the upper surface 22. A tray lip 34 is disposed along an entire upper edge 32 of the front wall 26, the rear wall 28, and the side walls 30.

An aperture 36 is disposed through the support base 20 upper and lower surfaces 22, 24. An aperture lip 38 surrounding the aperture 36. The aperture lip is slightly raised above the support base 20 upper surface 22.

The present tray 10 also includes a pair of parallelepiped legs 40 hingedly attached via a hinge 41 to the support base 20 lower surface 24 along about the length of each of the side walls 30. A slot 42 is disposed within each of the legs, the slot 42 having a length about the same length as the leg 42. The slot 42 has a width which will allow a user to store a plurality of napkins therein.

The instant tray 10 also provides a hollow handle 45 attached to the support base 20 along a central longitudinal axis of the support base 20 lower surface 24. The handle 45 includes a stalk 47 attached to the support base 20 lower surface 24 beneath the aperture 36. The stalk 47 extends downwardly from the lower surface 24 in a range of about 135 degrees to about 160 degrees from the lower surface 24. An elongated cylindrical internal cavity 49 is disposed an entire length of the stalk 47. The internal cavity 49 may receive a plurality of tip coins 103 therethrough. The handle 45 also includes an ergonomic grip portion 50 disposed on a front side 52 of the stalk 47. The grip portion 50 has a plurality of concave notches 54 disposed along the grip portion 50. The notches 54 are contoured to fit a human grip. A trigger 56 is attached to the stalk 47 above the grip portion 50. The trigger 56 selectively opens the aperture 36.

The present tray 10 also includes a parallelepiped reservoir 65 disposed parallel to the support base 20 lower surface 24. The reservoir 65 has an opening 67 through a top wall 69 near a front end 71 of the reservoir 65. The front end 71 of the reservoir 65 is disposed in about the same vertical plane as the trigger 56. The reservoir 56 is attached to a lower end 73 of the handle 45. The reservoir 56 has a bottom wall 75 on the about same horizontal plane as a lower edge 77 of each of the legs 40. The reservoir 56 also has an interior cavity 80. The interior cavity 80 removably receives therein an amount of tip coins 103 deposited into the aperture 26 and passing through the handle 45 internal cavity 49 and through the opening 67. A cap 82 is removably attached to a rear end 84 of the reservoir 65.

A contoured arm rest member 86 having an upper wall 87 attached to the support base 20 lower surface 24, a forward end 89 attached to an upper inside edge 91 of the handle 45 and a rearward end 93 attached to the support base 20 lower surface 24 near the rear wall 28 of the support base 20. A gap 95 is disposed between a lower wall 97 of the arm rest member 86 and the top wall 69 of the reservoir 65. The gap 95 is sized to removably receive a human adult forearm therethrough.

The present tray 10 further includes a U-shaped stabilizer member 99. The stabilizer member 99 has an apex 101 attached parallel to the rear wall 28. The support base 20 is placed in a balanced position upon the insertion of a human adult forearm 116 through the gap 95 and upon bracing an inner elbow 118 thereof against the stabilizer member 99.

A plurality of programmable drink buttons 105 is disposed on an outer edge 107 of the handle 45 near the trigger 56. The programmable drink buttons 105 are in wireless operational communication with the central processing unit 60, also referred to herein as "CPU". The CPU 60 has a transmitter 109 which is in wireless operational communication with a receiver 111 of a kitchen unit 112 that fills drink containers 114 with various drink types that have been ordered using the drink buttons 105. The support base 20 upper surface 22 supports a plurality of drink containers 114.

Use:

To use the present wireless drink order tray, the user begins by pushing each leg 40 outwardly from a folded position beneath the support base 20 into a position perpendicular to the support base 20 upper surface 22. The user then inserts a user's human adult forearm 116 through the gap 95, grips the grip portion 50, and braces the user's inner elbow 118 against the stabilizer member 99. The user selectively presses at least one of the drink buttons 105, each drink button 105 corresponding to a drink type. Each drink button 105 is in wireless operational communication with a central processing unit 60 which, in turn, is in wireless operational communication with a kitchen unit 112. When a drink button 105 is pressed, the corresponding drink type is ordered from the kitchen unit 112. By pulling the trigger 56, the user selectively opens the support base 20 aperture 36 into which tip coins 103 may be inserted, the tip coins 103 then passing through the stalk 47 internal cavity 49 and into the reservoir 65 interior cavity 80. The user may carry at least one drink container 114 on the support base 20 upper surface 22. The user may empty tip coins 103 from the reservoir 65 interior cavity 80.

The present tray 10 has a height in a range of about 6 inches to about 8 inches with the legs in an extended position, a length in a range of about 18 inches to about 24 inches, and a width in a range of about 12 inches to about 18 inches. With respect to the above description then, it is to be realized that the optimum dimensional relationships for the parts of the present wireless drink order tray to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Directional terms such as "front", "back", "in", "out", "downward", "upper", "lower", and the like may have been used in the description. These terms are applicable to the examples shown and described in conjunction with the drawings. These terms are merely used for the purpose of description in connection with the drawings and do not necessarily apply to the position in which the present invention may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A wireless drink order tray comprising:
    a support base comprising
        an upper surface;
        a lower surface;
        a front wall attached to the upper surface;
        an opposite rear wall attached to the upper surface;
        a pair of side walls attached to the upper surface, each side wall disposed between an opposite one of the front wall and the rear wall;
        wherein each of the front wall, the rear wall, and the side walls are attached at about a 45-degree angle to the upper surface;
        a tray lip disposed along an entire upper edge of the front wall, the rear wall, and the side walls;
        an aperture disposed through the support base upper and lower surfaces;
        an aperture lip surrounding the aperture, wherein the aperture lip is slightly raised above the support base upper surface;
    a pair of parallelepiped legs attached to the base lower surface along about the length of each of the side walls;
    a slot disposed within each of the legs, the slot having a length about the same length as the leg;
    a hollow handle attached to the support base along a central longitudinal axis of the support base lower surface, the handle comprising
        a stalk attached to the support base lower surface beneath the aperture, the stalk extending downwardly from the lower surface in a range of about 135 degrees to about 160 degrees from the lower surface;
        an elongated cylindrical internal cavity disposed an entire length of the stalk, the internal cavity receiving an amount of tip coins therethrough;
        an ergonomic grip portion on a front side of the stalk;
        a plurality of concave notches disposed along the grip portion, wherein the notches are contoured to fit a human grip;
        a trigger attached to the stalk above the grip portion, the trigger in operational communication with the aperture, wherein selectively pulling the trigger opens the aperture;
        a parallelepiped reservoir disposed parallel to the support base lower surface, the reservoir having an opening through a top wall near a front end of the reservoir, the front end disposed in about the same vertical plane as the trigger, the reservoir attached to a lower end of the handle, and a bottom wall on the same horizontal plane as a lower edge of each of the legs;
        an interior cavity of the reservoir, the interior cavity removably receiving therein an amount of tip coins deposited into the aperture and passing through the handle internal cavity and through the opening;
        a cap removably attached to a rear end of the reservoir;
        a contoured arm rest member having an upper wall attached to the support base lower surface, a forward end attached to an upper inside edge of the handle and a rearward end attached to the support base lower surface near the rear wall of the support base;
        a gap disposed between a lower wall of the arm rest member and the top wall of the reservoir, the gap sized to removably receive a human adult forearm therethrough;
    a U-shaped stabilizer member;
    an apex of the stabilizer member, the apex attached parallel to the rear wall.

2. The wireless drink order tray of claim 1 further comprising:
    a plurality of programmable drink buttons disposed on an outer edge of the handle near the trigger, the programmable drink buttons in wireless operational communication with the central processing unit, the central processing unit having a transmitter in wireless operational communication with a receiver of a kitchen unit.

3. The wireless drink order tray of claim 2 wherein the support base upper surface supports a plurality of drink containers.

4. The wireless drink order tray of claim 3 wherein the support base is placed in a balanced position upon the insertion of a human adult forearm through the gap and bracing an inner elbow of the human against the stabilizer member.

5. A method of using the wireless drink order tray of claim 4 wherein the method comprises:

pushing each leg outwardly from a folded position beneath the support base into a position perpendicular to the support base upper surface;
inserting a user's human adult forearm through the gap;
gripping the grip portion by the user;
bracing an inner elbow of the user against the stabilizer member;
selectively pressing at least one of the drink buttons, each drink button corresponding to a drink type, wherein pressing a drink button orders a drink type from the kitchen unit;
selectively pulling the trigger, wherein pulling the trigger opens the support base aperture;
inserting tip coins into the aperture;
emptying tip coins from the reservoir interior cavity; and
carrying at least one drink container on the support base upper surface.

* * * * *